(12) United States Patent
Artley et al.

(10) Patent No.: US 7,264,638 B2
(45) Date of Patent: *Sep. 4, 2007

(54) POLYETHYLENE GLYCOL SATURATED SUBSTRATE AND METHOD OF MAKING

(76) Inventors: John William Artley, 4 Park Ave., Apt. 10-R, NY, NY (US) 10016; Thomas Edward Lister, N6570 Riverview Rd., Black River Falls, WI (US) 54615

( * ) Notice: Subject to any disclaimer, the term of this patent is extended or adjusted under 35 U.S.C. 154(b) by 0 days.

This patent is subject to a terminal disclaimer.

(21) Appl. No.: 10/022,959

(22) Filed: Dec. 18, 2001

(65) Prior Publication Data

US 2002/0081923 A1    Jun. 27, 2002

Related U.S. Application Data

(60) Provisional application No. 60/257,528, filed on Dec. 21, 2000.

(51) Int. Cl.
*D06M 13/148* (2006.01)

(52) U.S. Cl. .................................. 8/115.56; 427/372.2

(58) Field of Classification Search .................. 442/93, 442/123, 124; 8/115.54, 115.51, 115.6; 427/372.2
See application file for complete search history.

(56) References Cited

U.S. PATENT DOCUMENTS

| | | | | |
|---|---|---|---|---|
| 3,981,807 A | * | 9/1976 | Raynolds | 252/8.61 |
| 4,780,102 A | * | 10/1988 | Harper, Jr. | 8/196 |
| 4,851,291 A | * | 7/1989 | Vigo et al. | 428/393 |
| 4,871,615 A | | 10/1989 | Vigo et al. | |
| 4,908,238 A | * | 3/1990 | Vigo et al. | 427/389 |
| 5,562,739 A | * | 10/1996 | Urben | 8/116.4 |
| 6,607,994 B2 | * | 8/2003 | Soane et al. | 442/59 |
| 6,617,268 B1 | * | 9/2003 | Offord et al. | 442/187 |
| 2003/0013369 A1 | * | 1/2003 | Soane et al. | 442/181 |

OTHER PUBLICATIONS

Vigo, Tyrone L. et al. "Multipurpose woven cotton and cotton/polyester blends containing crosslinked polyols affixed by low temperature cure". Applied Macromolecular Chemistry and Physics. (1992): 1-20.*

Vigo, Tyrone L. et al. "Improvement of various properties of fiber surfaces containing crosslinked polyethylene glycols". Applied Polymer Science. (1989): 371-379.*

* cited by examiner

*Primary Examiner*—Douglas McGinty
*Assistant Examiner*—Amina Khan
(74) *Attorney, Agent, or Firm*—Schmid PA

(57) ABSTRACT

Polyethylene glycol may be applied and bound to a broad range of substrates and materials, such as nonwoven, woven, knit, foam and film structures resulting in the manufacture of varied and useful commercial products. The invention describes various techniques and methods for saturating and bonding polyethylene glycol to a wide range of types of materials and substrates in a continuous commercial production environment.

Rather than using numerous machines and processes scattered around a production environment, or even located in multiple locations, which is inefficient, results in poor quality products, generates unacceptable scrap and waste and is not cost effective, the invention describes various methods and techniques used to permanently apply polyethylene glycol to various types of substrate and materials in an integrated production environment. Also disclosed are some of the numerous features and benefits added to substrates and materials to which polyethylene glycol has been permanently bonded.

1 Claim, 5 Drawing Sheets

The PEG System

Module A – Formula Application

Module B – Curing Oven

Module C - Wash Box

Module D – Dryer

Bulk Treatment

Thermal Cascading

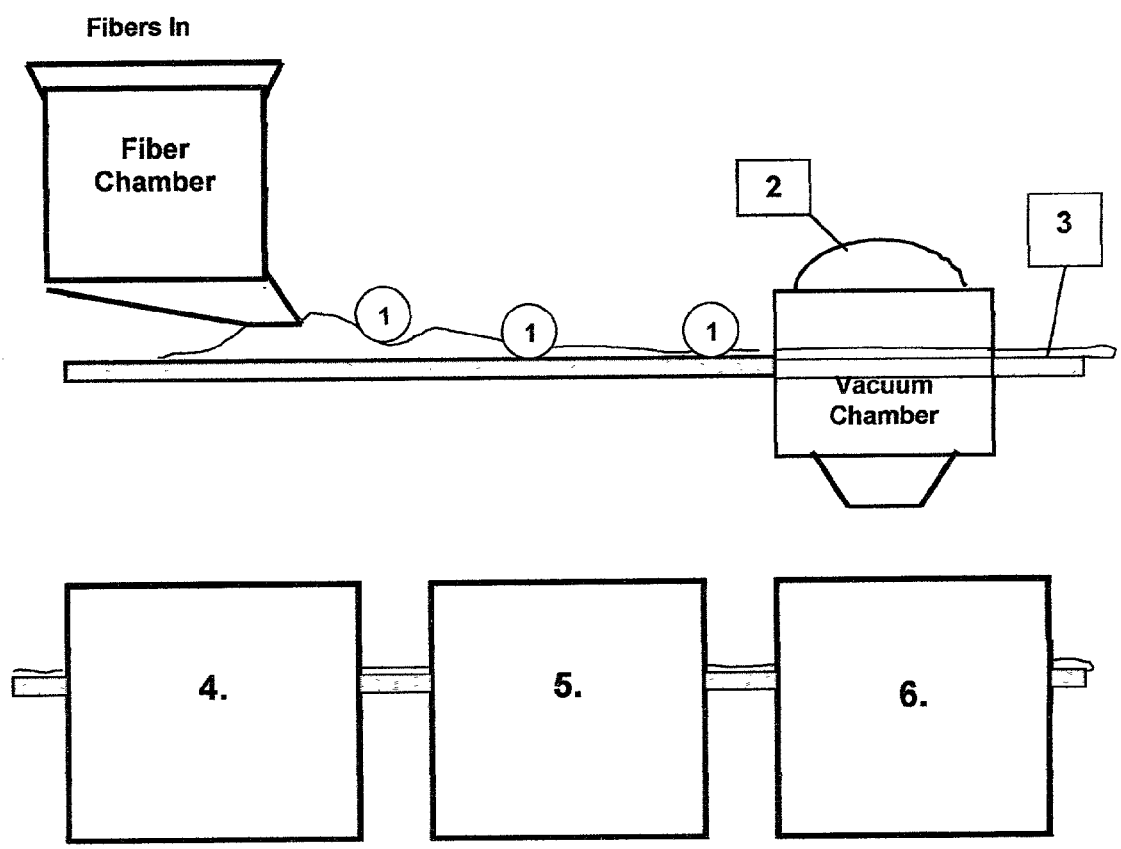

POLYETHYLENE GLYCOL SATURATED SUBSTRATE AND METHOD OF MAKING

CROSS REFERENCE TO RELATED APPLICATIONS

Applicants claim priority to the subject invention with Provisional Patent Application titled: "Polyethylene Glycol Saturated Substrate and Method of Making Same," filed Dec. 21, 2000 and issued Application Ser. No. 60/257,528.

BACKGROUND OF THE INVENTION

This invention relates to modified textile fibers and other modified substrates. The concept of preparing temperature adaptable textile substrates has been previously demonstrated and described by Vigo, et al in U.S. Pat. Nos. 4,851,291 (issued Jul. 25, 1989), 4,871,615 (issued Oct. 3, 1989) and 4,908,238 (issued Mar. 13, 1990). However the inventions cited above exhibit certain limitations when the technology is applied in a high speed, commercial production environment which limitation include, but are not necessarily limited to:

a. No methodology is cited related to treating and curing substrates with the formulation in a high speed, commercial production environment.
b. Chemicals not suitable for broad commercial use were specified in the cited patents.
c. Occasional and unexplained "reaction reversal" causing the bound polymers and resins to return to a liquid form and drain from the fabrics.
d. Polyethylene glycol formulations containing inappropriate molecular weights resulted in inconsistent thermal performance.
e. Using the cited patents, treated materials were often stiff with a hand deemed to be unacceptable for their intended use.
f. Polymer add-on levels were often inconsistent resulting in unacceptable commercial performance and unnecessarily high chemical costs.
g. Drying and curing times and curing temperatures were not compatible with available textile plant processing equipment and hardware.
h. Inconsistent "cross-linking" of the formula to certain substrates resulted in unacceptably high scrap rates.
i. Under certain conditions, treated material was slippery, heavy and curled when wet and were unable to be processed on standard textile finishing plant equipment
j. Under certain conditions, formulation residue remained on treated fabrics giving the substrate an unacceptable wax-like or "greasy" feel.

BRIEF SUMMARY OF THE INVENTION

The invention relates to improved techniques for modifying textile fibers and various other substrates including, but not limited to, foam, wood fibers, paper, leather, ceramic, glass fibers and other materials to which insolubilized polyethylene glycol has been applied.

The embodiment describes methods and techniques utilized to saturate and bond polyethylene glycol to numerous types of materials and substrates in a continuous commercial production environment. Polyethylene glycol may be applied and bound to a broad range of substrates and materials, such as nowoven, woven, knit, foam and film structures resulting in varied and useful commercial products, with applications in a variety of fields of use including healthcare, consumer and industrial. Rather than using numerous machines and processes scattered around a production environment, or even located in multiple locations, which is inefficient, results in poor quality products, generates unacceptable scrap and waste and is not cost effective, the embodiment describes various methods and techniques used to apply the polyethylene glycol formulation to various types of substrate and materials in a single, highly flexible, integrated production environment. This environment ties together efficiently and economically a diverse range of equipment, hardware and controls into a cost effective, integrated manufacturing operation for the application and bonding of polyethylene glycol to a wide and diverse range of materials and substrates.

The invention also describes:

Treated products which are thermally relevant: i.e. they perform within meaningful human comfort ranges and such temperature adaptable substrates can now be processed covering a wide and varied range of temperature gradients.

The concept and process of applying the formulation in varying molecular weights to multiple layers of substrates ("thermal cascading") to provide enhanced and prolonged user comfort has been developed.

The use of the polyethylene glycol formulations when bound to a substrate to control and/or eliminate certain bacteria and fungi. The embodiment has identified and defined the mechanisms controlling the antimicrobial properties of substrates treated with the formulation.

Methods and techniques to correct "reaction reversal" without impacting the multifunctional performance properties of the technology while also enhancing and preserving the strengths of cellulosic fibers, yarns and fabrics.

Improvements to the prior art cited above made by experimenting with the different molecular weights of polyethylene glycol which have differing melting and crystallization points, and by developing unique and different formula blends.

Dilution techniques developed which allow the formula to be "cut" with de-ionized and/or distilled water to better control formula add-on while reducing the chemical content of the finished goods and improving the "hand" of the treated substrate.

The identification of knitting lubricants, oils and silicone-based additives as causative to the blocking of the cross-linking function of the polyethylene glycol formula with such artifacts to be removed prior to the application of the formula by scouring or burning of the substrate to be treated.

Techniques which permit control of the pH level of the treated substrate during the post-cure wash process. A basic wash bath technique using a 1% by weight solution of water and soda ash to rinse the highly acidic treated materials in an 11 pH bath was developed. Neutralization by this technique returned the treated substrates to a neutral pH level thereby eliminating the potential for reaction reversals and polymer wash outs.

Various methods developed to reduce curing oven dwell times which accelerate the curing process which methods include pre-heating of the formula.

Protocols and procedures developed for the real-time monitoring of the dry-cure operation which eliminates guesswork and accelerates the throughput of substrates treated with the polyethylene glycol formula.

The blending of various dye stocks into the formulation to accomplish on-line dyeing concurrent with the application and curing of the formulation.

Techniques designed to mechanically stretch knit materials on a continuous basis during curing which further improve the hand of the treated substrate.

The development of techniques and methods to bulk treat finished products (i.e. socks) in a continuous process.

Techniques and methods for applying polyethylene glycol formulation by foaming the formula onto or through the substrate. For certain types of substrates, this technique improves the loft and hand of a treated structure and results in a more uniform application of the formula throughout.

Techniques developed which significantly increase the abrasion resistance and durability of synthetic nonwoven substrates and converted products.

The development of techniques and methods for laminating polyurethane foam to polyethylene glycol-treated substrates without affecting its multifunctional properties.

The development of techniques and methods for the application of polyethylene glycol to both open and closed foam cell structures, and subsequent curing.

BRIEF DESCRIPTION OF THE DRAWINGS

FIG. 8 depicts a process flow diagram for producing a nonwoven substrate which random fibers are permanently bonded into a durable substrate according to the present invention.

DETAILED DESCRIPTION OF THE INVENTION

Figure 1:
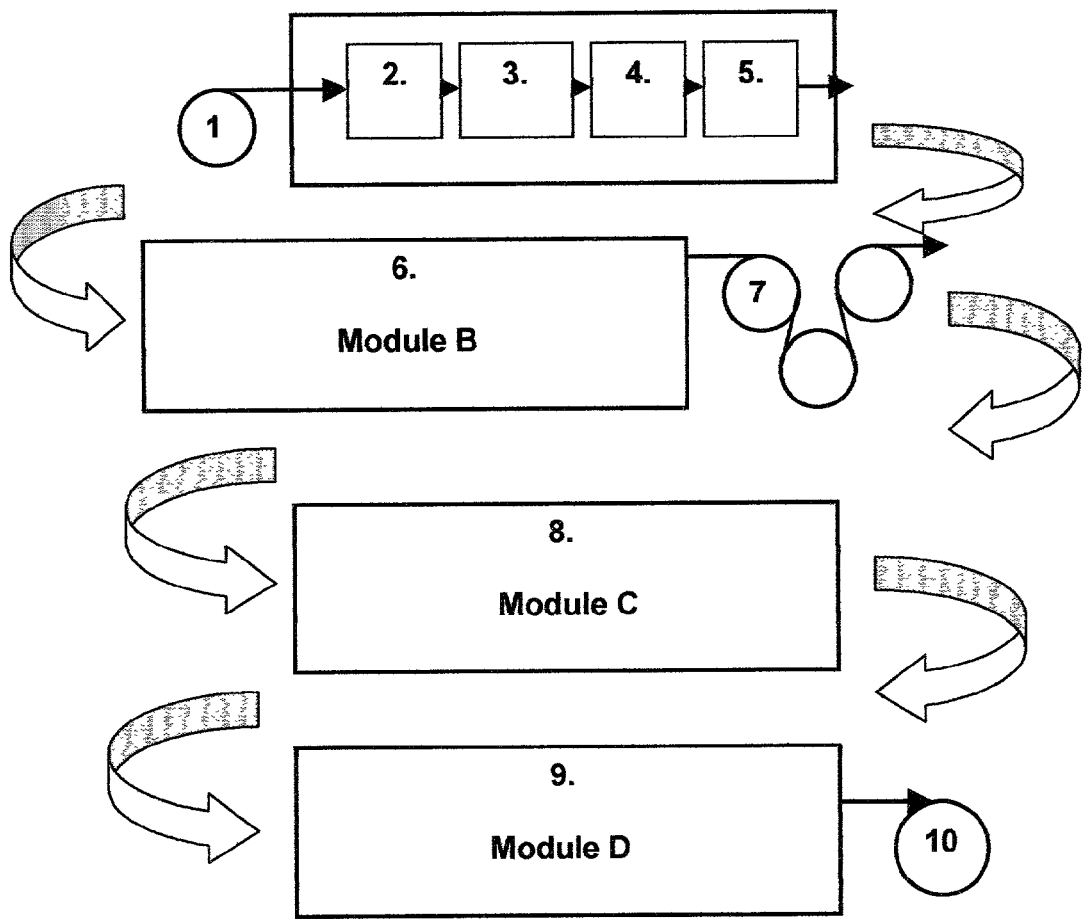
FIG. 1 depicts the preferred embodiment of the process flow diagram for Modules A-D according to the present invention.

In the following Detailed Description, the following terms are used to describe certain components of the Invention as follows:

The terms "PEG," "PEG Technology," "PEG-treated," "PEG-saturated," PEG formulation," or "PEG formula," are used individually, interchangeably or collectively to mean the chemical formulas and the methods and technique(s) used for the permanent application and bonding of the polyethylene glycol polymer to a substrate.

A "substrate" is defined as any fiber, fiber blend, fabric or material whether nonwoven, knit or woven, or any structure such as reticulated polyurethane foam, for example, or a film, to which the PEG Technology is, may be, or has been, applied in a commercial production environment.

The term "polyethylene glycol" is the name of a long chain water soluble polymer produced in varying molecular weights and which is the primary chemical component of the PEG Technology along with various binders, catalysts and acids.

Successful application of PEG Technology involves three variables; the substrate, the PEG formula and the method of applying the PEG formula to the selected substrate. The three must match to achieve the desired level of performance as described below.

The Substrate

The substrate may be of any woven, nonwoven or knit construction, of any fiber type or fiber blend; or, any foam structure, or any other material or film which lends itself to application of the PEG formula.

The PEG Formula

Various molecular weights of the polyethylene glycol polymer have been employed in the PEG formula. Different molecular weights have different melting and crystallization points, both of which have an impact on the performance of substrates treated with PEG. For example, polyethylene glycol with a molecular weight of 1450 has been demonstrated to provide good thermal performance over the relevant range of human comfort.

Dilution techniques are disclosed which permit the PEG formula to be "cut," or diluted, with water without having a negative impact on the performance of the PEG-treated substrate. By increasing the ratio of water to the PEG polymer, and other solids contained within the formula, better control of the wet formula pickup is realized. Additionally, the reduced solids content of the PEG formula results in an improved "hand" by lowering the additive chemical content of the finished goods.

Resins and catalysts with ultra low levels of formaldehyde, or having no formaldehyde at all, have been incorporated into the PEG formula with no degradation of performance. Where formaldehyde is present, levels have been reduced to approximately 53 parts per million (based upon the AATCC Method 112 Sealed Jar Test after three replications).

The amount of resin employed in the PEG formula has been varied and reduced by utilizing more efficient and highly reactive resins.

Environmentally friendly acid catalysts, such as citric acid and magnesium chloride, have been substituted for earlier types of acids such as p-toluene-sulfonic acid.

An example of an improved PEG formula would include: 10-20% DMDHEU Resin, 5% MgCl, 5% Citric Acid and 50% PEG.

With all of the components of the formula thoroughly blended using paddle blades in a holding tank mounted close to the point of its application. Depending upon the use and application of the substrate treated with PEG, there are numerous variations to the formula.

Research has demonstrated that the PEG Technology may be used as a "carrier" of other beneficial performance enhancing chemistries such as insect repellants or color dyes.

Foaming agents maybe incorporated into the PEG formula with no adverse effect to the catalytic reaction. This permits the foaming of the PEG formula on to a substrate resulting in better control of the PEG formula wet add-on and a corresponding reduction in chemical costs.

PEG formulae incorporating higher molecular weight polyethylene glycol, when applied to a variety of substrates, significantly increases the snag performance and abrasion resistance of the treated material at dry add-on levels which are below add-on levels previously claimed in prior issued patents.

Experiments have been conducted with various PEG formulae to determine which formulae are best suited to reduce, or eliminate, color bleeding of dyed substrates. Guidelines have been developed to match certain dye stocks, and color dye techniques, with various PEG formulae.

METHOD OF APPLYING AND CURING THE PEG FORMULA

The following sections, Modules A-D (FIG. 1), describe the individual components of a fully integrated, continuous process system designed for the commercial application of the PEG Technology to virtually any substrate including knit, woven and nonwoven materials ("The PEG System"). The PEG System has been designed so the PEG formula may be applied to any substrate, then dried, cured and neutralized in a continuous, totally integrated multiple step system. For maximum flexibility, the individual modules described below cover a specific function of The Peg System. Each A, B, C or D Module also incorporates several alternative solutions (FIGS. 1, 2-9) for a specific application function, thereby providing an optimum system configuration for any specific substrate, or substrate type, to be treated with the PEG Technology.

To illustrate the flexibility and adaptability of The PEG System to the processing of a variety of substrates, two distinctly different examples of treating a substrate are given below, with each utilizing the flexibility of The PEG System to achieve an optimum solution for the application of PEG.

EXAMPLE 1

In the first instance, an open-width, shirt weight fabric is to be treated with a particular PEG formula, then cured and neutralized. In this case, the PEG formula is maintained at a temperature of about 114° F. (45° C.) in an on-line formulation holding tank (2) (employing a PEG molecular weight of 1450). The PEG formula is applied using a PAD (3) and the fabric is then fed into the oven (6), and/or passed over drying cans (7) for drying and curing. Because the shirt weight fabric weighs only about 4 ounces per square yard, the target weight for dry (weight after curing) PEG formula add-on is approximately 30%.

The combined weight of the substrate and PEG after application and curing is about 5.2 ounces per square yard. Also, because the fabric is lightweight, the pin tenter frame option is selected to hold the fabric in position as it passes through the oven. Additionally, because of the lightweight of the fabric, oven dwell times are reduced thereby increasing the throughput speed of the substrate through The PEG System. The shirt weight fabric is next neutralized (8) as discussed in the Module "C" Section, and then dried (9) as described in the Module "D" Section, and rolled (10) for shipment.

EXAMPLE 2

In another instance, a high loft open width nonwovens substrate comprising a blend of 50% wood pulp fibers and 50% polyester is being treated with the PEG formula. The target dry PEG formula add-on, after curing, is about 60%; the weight of the nonwovens substrate before the application of PEG is 6 ounces per square yard. The combined weight of the substrate and PEG after application and curing is about 9.5 ounces. The application for this treated structure is an absorbent incontinent underpad.

For maximum liquid absorption, the loft, or height of the nonwoven substrate must be maintained. Therefore, for this nonwoven substrate, the PEG formula is applied by spray assembly and vacuum extraction (4). The spray/vacuum module is positioned in front of the curing oven. As the substrate is unwound, roller units are used to route the substrate over and/or around the PAD (3) and through the spray/vacuum unit (5). Because it is desirable to process the nonwovens substrate at the highest throughput rate feasible without effecting the bond of the PEG formula to the fibers, infrared heaters may be utilized to pre-heat the PEG saturated substrate just before it enters the drying/curing oven (6).

A chain driven belt assembly is utilized to carry the PEG saturated nonwoven structure through the drying/curing oven (6) in a relaxed state. Because of the loft of the nonwoven structure, the throughput rates, and zone-by-zone oven temperature may be readily adjusted to correspond to the curing times required for this type of structure, but generally the curing temperatures would be in the range of between 212° and 220° F.

Once the high loft nonwoven structure has been dried and cured, drive roller assemblies are used to pull the treated and cured nonwovens substrate from the curing oven and to pass it through the Module "C" neutralization tank (8). The nonwovens substrate passes from the neutralization tank, are rinsed and then reintroduced to a dryer unit (9) which removes the H2O from the nonwovens. The treated and processed substrate is wound into a roll (10) and the process has been completed.

MODULED "A" SECTION

Preparation of a Substrate Prior to Drying, Curing and Neutralization

Figure 2:
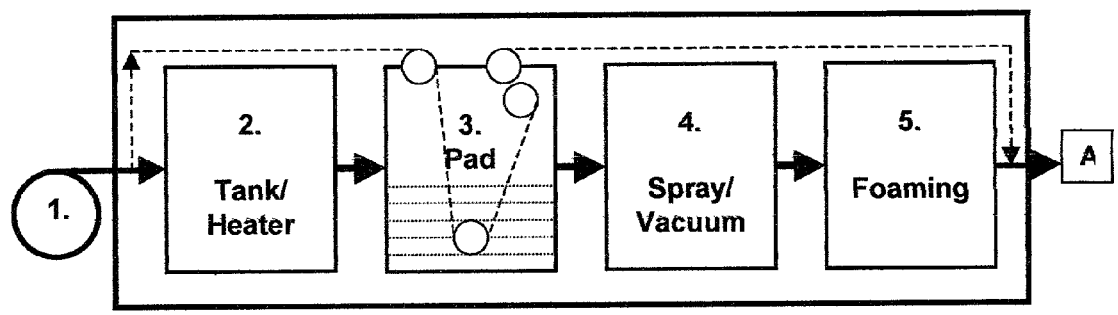
FIG. 2 depicts the Module A embodiment of the present invention.
Figure 3:
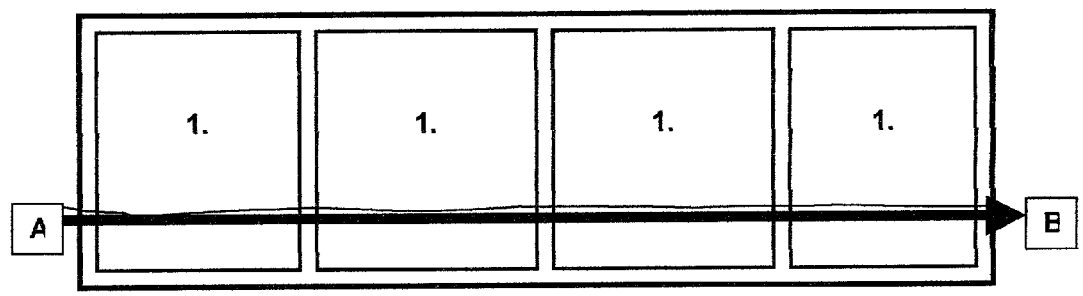
FIG. 3 depicts the Module B embodiment of the present invention.
Figure 4:
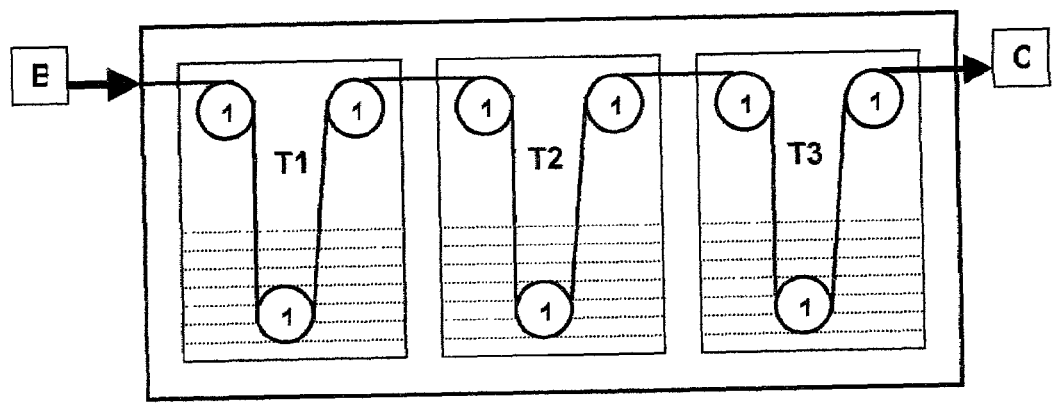
FIG. 4 depicts the Module C embodiment of the present invention.
Figure 5:
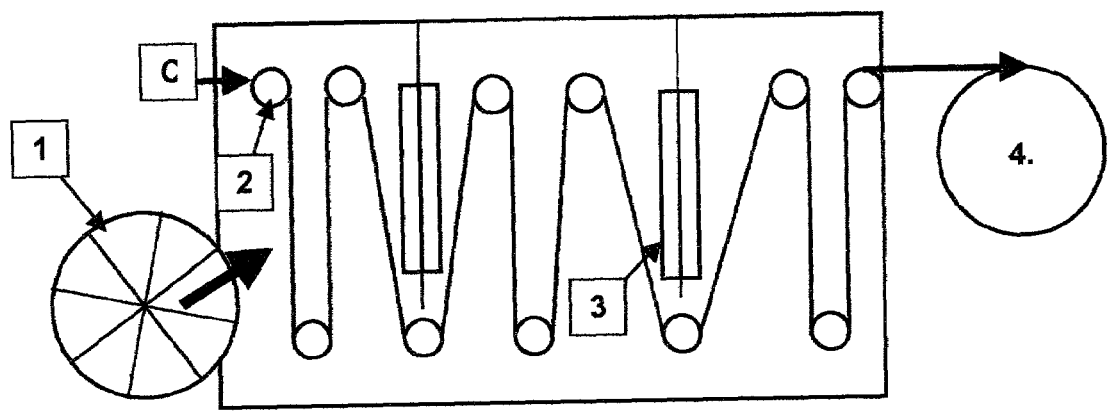
FIG. 5 depicts the Module D embodiment of the present invention.

Scouring and Burning to Remove Surface Finishes Before the Application of the PEG Formula The following embodiments are depicted in FIG. 2. A more efficient bond of the PEG formula to a substrate can be effected if the material or substrate is first thoroughly scoured, washed or surface burned to remove any residual surface finishes from the textile prior to the PEG application. Surface finishes that should be removed include, for example, lubricants, waxes and oils. These finishes are typically applied to fibers, or yard goods, as part of the substrate manufacturing process.

If residual surface finishes are not completely removed from a fabric or material prior to applying the PEG formula, complete catalytic reaction and bonding of the resins and polyethylene glycol to the substrate fibers would not occur.

Pre-Heating of the Substrate after Saturation With the PEG Formula Prior to Entering the Oven Reduction of oven dwell times and/or the acceleration of the drying/curing and bonding process is accomplished by pre-heating the PEG-saturated substrate prior to its passing into the curing oven. After saturation with the already pre-heated PEG formula using one, or a combination of the two techniques described below, the PEG-treated substrate is further heated to approximately 212° F. (100° C.) prior to entering the oven. This results in a faster more complete reaction of the cross-linking process.

No. 1 Technique—Maintaining the PEG Formulation in a Viscous State by Pre-Heating Prior to its Application to a Substrate The ease, speed and accuracy of the actual application of the PEG formula to a substrate may be improved if the formula is maintained at an elevated temperature and remains in a less viscous state. This may take place in a drum or holding tank (2), or other suitable container which contains, or is surrounded by, a suitable heating element

No. 2 Technique—Pre-Heating of a PEG-Saturated Structure Before it Enters the Curing Oven Preheating a PEG-treated substrate before it enters the curing oven helps to reduce thermal droop in the curing oven interior and assists in the maintenance of a more uniform temperature within the individual zones of the curing oven resulting in an improved quality product.

By pre-heating of the PEG-treated substrate prior to entering the curing oven, the thermal phase change mechanism of the PEG Technology is overwhelmed to the point where the crystalline structure of the polyethylene glycol can no longer substantially absorb additional thermal energy, and the actual temperature of the structure will now rise to the temperature point needed to effect the catalytic reaction in the PEG formula which is 220° F. for 1½ minutes, which temperature initiates the bonding process Pre-heating the substrate results in (a) a more efficient and uniform cure of the PEG-treated substrate, (b) an acceleration of the speed of the curing process, (c) less reduction in the interior temperature of the oven, (d) the utilization of smaller curing ovens.

Pre-heating of the substrate is particularly applicable to thicker and/or more dense substrates. Other types of lightweight substrates, often do not require pre-heating because the thermal properties of these types of fabrics are relatively insignificant compared with a more dense, higher loft substrates.

Additionally, two types of readily available heat sources are effective for preheating a PEG-treated structure before it enters the drying/curing oven. The first heat sources is high pressure steam passed through a perforated hollow tube, or tubes, mounted across the web, or width, of the substrate, just in front of the entrance to the curing oven. The second technique is to install controllable infrared heaters in approximately the same location as the steam heaters.

The advantage of infrared heaters is that they maybe quickly and more accurately controlled and adjusted as compared to a steam heat source. A broader range of PEG-treated substrates may be processed with the PEG System using infrared heating devices. Additionally, with the use of infrared-type heaters, no additional water is added to the substrate as is the case with the use of steam.

Using a PAD to Apply the PEG Formula to a Substrate

In many instances, a traditional PAD and nip roller assembly (3) of the type found throughout the textile industry, may be utilized to apply the PEG Formula to a substrate before entering the drying/curing oven. Typically, PADs are used to apply a range of standardized finishes to textiles such as anti-wrinkling finishes for example.

The pre-heated PEG formula is first poured into the heated PAD holding tank and maintained thereafter at a constant level within the tank. One, or more, rubber coated nip, or "pinch" drive roller assemblies, pull the substrate to be saturated with the PEG Technology from the roll of substrate material previously positioned in front of the PAD.

The substrate material passes into the PAD formula holding tank where it is passed over and under a series of rollers positioned in the tank. This provides the material with adequate dwell time within the tank to be thoroughly saturated with the PEG formula. The PEG-saturated substrate emerges from the tank where it next passes through a second set of rubber coated nip drive roller assemblies. The pressure applied to this set of drive rollers may be controlled to a pre-determined pressure level. As the PEG saturated substrate passes through the second set of nip drive roller assemblies, the excess PEG formula is squeezed from the substrate and drains back into the holding tank for reuse. The PEG-treated substrate next passes into the drying/curing oven. The pressure applied to the nip rollers determines the desired amount of wet pickup needed to arrive at the preferred dry add-on after curing of the substrate.

Depending upon the type of material being treated with the PEG formula, as well as other variables such as the loft of the substrate and/or its basis weight, modified PAD drive rollers may be required. This is because the PEG-treated substrate is lubricious and in some instances the rollers will not properly grip the material. In this instance, ribbed, or textured, drive rollers may be used for an improved grip. In some cases, removing one or more sets of rollers, or drive rollers, shortens the path that the PEG-treated substrate must follow, thereby eliminating, or reducing, problems associated with slipping, or skewing of the material before it is dried and cured.

PAD-type tanks are particularly well suited for PEG-treated substrates where the pressure of the nip rollers is not an issue.

Spray Application of the PEG Formula and Vacuum Extraction to Improve the Coating of Fibers and to Maintain Loft While Retaining an Acceptable Hand For certain substrates treated with the PEG formula, such as various high loft materials or nonwoven structures, when pinch or nip-rollers of the type described above are utilized, the substrate may be compressed or flattened just before it passes into the curing oven. It has been found that when these high loft or nonwoven substrates are cured in a flattened or compressed state, they will not regain their original height or loft which may reduce their ability to absorb and retain liquids and makes the substrate unacceptably stiff and board-like. To prevent the substrate from becoming compressed or flattened before curing, a vacuum extraction box assembly (4) may be utilized to remove excess PEG formula without compressing the structure.

One form of a vacuum extraction device is a metal box having a width of which is slightly wider than the width of the finishing line, or approximately 75 inches, is employed. The height of the metal box is about 24 inches and the length is approximately 48 inches. The metal box contains two internal chambers and is designed so that a substrate saturated with the PEG formula is passed horizontally through the first chamber (using entrance and exit slots cut into the feed an exit ends of the first chamber).

In the chamber, in the upper portion of the metal box before the vacuum extraction unit are three side-by-side parallel hollow tubes, each separated by about 2 inches. Along their length, the hollow tubes have a series of perforated holes. Into each hole is tapped a shaped spray nozzle of the type which provides a uniform overlapping elliptical, or circular, spray pattern. All of the nozzles face downward toward the surface of the substrate to be saturate which the PEG formula as the substrate passes beneath. One end of each hollow tube is closed.

The three open ends of the spray tubes are connected to a manifold assembly through which PEG formula is pumped from a holding tank using a conventional wet-stump type industrial pump. An exterior mounted valve placed immediately before the manifold, controls the flow and pressure of the PEG formula. An on-line pressure gauge is mounted between the value and the manifold to provide a constant pressure reading. A tube is inserted in the bottom of the first chamber to drain away excess PEG formula. The excess PEG formula drains into the formula holding tank and is re-circulated for later use.

As the PEG-saturated substrate passes through the slot into the second chamber of the metal box, it passes over a metal plate, which fits into the interior of the box approximately 12" from the bottom. Within this plate is an elongated slot that passes across the width of the metal plate. This slot is approximately one (1") in width and is made adjustable to increase, or decrease, the slot opening.

A vacuum pump and hose are fasted to the bottom of the second chamber, directly under the slot. A valve located upstream from the vacuum pump, but positioned before the hose enters the second chamber, allows the vacuum to be readily adjusted. A vacuum gauge was tapped into the hose between the value and the metal box to provide a visual on-line reading of the amount of vacuum being applied to the slot assembly. When the electric vacuum pump is turned on negative pressure is induced into the lower chamber of the second section of the metal box. By increasing, or decreasing the vacuum pressure, combined with adjustments to the width of the vacuum slot above, the negative pressure in the lower chamber is fine tuned.

The vacuum extraction device operates in the following manner: a substrate passes through the first chamber of the metal box, directly under the three spray tube assemblies. The PEG formula is sprayed onto the surface of the substrate as it passes underneath. When the saturated substrate reaches the second chamber, it passes over the metal plate and vacuum slot and the negative pressure in the lower chamber uniformly pulls the unnecessary PEG formula from the substrate. The removed PEG formula is returned to the holding tank for reuse. The PEG-treated substrate moves from the metal box into the curing oven. While passing through the metal box, light tension is maintained on the substrate by a standard extraction roller assembly.

Rudimentary trial and error are employed to determine the correct amount of pressure to be used on the PEG formula spray assembly and the amount of vacuum to be pulled on the vacuum slot, and the adjustment of the width of the vacuum slot On-line testing, application trials and laboratory evaluation demonstrate that the PEG formula spray application and vacuum extraction box assembly offers the following benefits:
a. A more uniform saturation of the fibers with PEG occurs throughout the substrate matrix, which results in a durable, flexible structure.
b. By adjusting both the vacuum, and the width of the vacuum slot, this extraction technique quickly and accurately allows the correct amount of wet pickup on a substrate.
c. The fibers are not crushed or matted resulting in an improved hand and appearance for the substrate after curing.
d. Because of better control over the extraction of excess PEG formula from the substrate after saturation, problems associated with smearing and marking may be substantially reduced.
e. By re-circulating the excess PEG formula vacuum extracted from the substrate, formula costs maybe substantially reduced.

Foaming of the PEG Formula and Vacuum Extraction to Reduce the Amount of PEG Formula Required While Improving the Accuracy and Control of Formula Wet Pickup Standard, commercially available foaming equipment (5) of the type used by numerous companies to apply various finishes to woven, nonwoven and knit fabrics and materials, may be readily employed in the application of the PEG formula.

Single, or double-sided foaming heads may be utilized to apply the PEG formula to one, or both, side(s) of a substrate. For example, when a dense or high loft substrate is being PEG-treated, a double sided foaming arrangement will permit improved penetration of the formula into the structure being treated. When necessary, after foaming, a vacuum extraction device may be utilized to remove excess PEG Formula from the substrate prior to curing.

Some of the benefits resulting from the use of a foaming device to apply PEG to a substrate include:
a. When foamed onto a substrate and subsequently cured, the PEG formula may be used as a binder to attach, and bond, the fibers together into an integrated, matrix-like flexible structure of the type used in the production of nonwoven materials.
b. A more thorough and complete coating of the fibers of the substrate may be accomplished with the PEG Formula.
c. The PEG application process benefits from improved economics, because the amount of PEG wed add-on may be more accurately controlled with a foaming device.
d. With foaming, the loft, or height, of the substrate being treated is maintained thereby providing a better appearing finished product with an improved hand.
e. By using a foaming technique to apply PEG, more dense, and/or higher loft substrates may be finished with the formulation.
f. Foaming of PEG offers the flexibility of applying the formulation to one, or both, side(s) of a substrate dependent upon the type of substrate being treated with PEG.

MODULED "B" SECTION

Improved Methods and Techniques for Drying and Curing the PEG Formulation after its Application to a Substrate Drying/Curing A variety of readily available standardized drying frames (ovens) (FIG. 3) and devices of the type found in numerous textile finishing operations may be successfully used for curing PEG-treated substrates. In come instances, nominal modifications to an oven may be required to adapt it for application of the PEG formulation. When installed, automated computer-based controls provide optimum flexibility for managing, or controlling, the PEG drying/curing operation. Multiple independently controlled thermal zones (1) (ranging from several to as many as ten) within the PEG drying/curing oven provide additional zone-by-zone control flexibility.

Drying/curing ovens of the type designed to move a material through in a relaxed state (with no tension being applied to the substrate) on chains, or wide belts, have been found to be suitable for certain types of substrates such as nonwoven materials, tubular knits and high loft substrates. For other substrates, such as shirt weight fabrics for example, a pin tenter frame may be used to maintain tension on the substrate as it passes through the oven. The nature of the material and its intended use determines whether a substrate should be cured in a tension state or a relaxed, tensionless state.

One method to determine the proper curing or drying temperature of PEG-treated substrate is, (a) to utilize a dynamic infrared scanning thermometer and, (b) to read the temperature from the surface of the substrate.

Drying and curing temperatures, and curing dwell times for a particular substrate are sensitive to a number of variables, including fiber blends, loft and density of the structure being cured and the type of material being processed (i.e., a nonwoven, a knit and a woven substrate will generally have differing drying characteristics).

By monitoring and controlling oven-curing temperatures, scorching and over-curing of the PEG-treated substrate can be prevented. Scorching results in a degradation and "browning" of the resin/polymer. Over-curing causes a "board-like", harsh, stiff, and unacceptable hand and degrades thermal performance.

The speed, or throughput rates, of the PEG-treated substrates through the oven can be substantially increased and better controlled, if the amount of H2O is minimized prior to commencing the drying/curing cycle. This variable is also dependent upon the type of drying device used, the number of available zones, types of controls and the heat source utilized.

Drying temperatures after removal of H2O should not exceed 220° F. (104° C.). The initial zones in the curing oven, when the substrate is still laden with moisture, can be set as high as 350° F. (176.5° C.), with the subsequent zones stepped to lower temperatures as the PEG-treated substrate dries. When the surface temperature of the material exceeds 212° F. the material is dry and all subsequent curing zones are set to 220° F. Curing of any substrate occurs in 1½ to 2 minutes. No curing beyond that time is recommended.

Drying and Curing Using Heated Drums

"Drum heaters" are a standard type of drying mechanism found in textile manufacturing. Drum heaters are comprised of a series of large hollow "drums"; each sized approximately 36" to 48" in diameter and up to approximately 72" in length. The "drums" are arranged in series and vary in number. The textile passes over and around the drums as the drums are turned by motors, belts or gears. The drums are heated with steam. The tension applied to the substrate as it passes around the drums may be easily adjusted.

To dry and cure a PEG-treated substrate, the drums are pre-heated to a temperature of approximately 210° F. (99° C.). A cloth leader is passed over the first heated drum, and then under and over, the subsequent drums until the threading of all drums has been completed. The drum drive mechanism is initiated and the drying and curing process commences. Upon completion of drying and curing a pair of drive rolls pick up and feed the dried and cured substrate to the neutralization tank as described in the Module "C" Section which follows.

MODULED "C" SECTION

Neutralization, Removal of Non-Reacted Formula Components and the Use of Softeners Once a substrate is dry/cured, the substrate is passed into a wash box (FIG. 4) comprised of a series of liquid holding tanks. The first tank (T1) may contain a basic solution consisting of water and soda ash with a ratio of 100/1 by weight. This yields a pH 11 bath. Next, the substrate is subjected to a vigorous rinse to remove salts and non-reacted formula components (T2). Non-removed surface deposits of non-reacted PEG formula can lead to false "wash outs" of PEG which will result in false or misleading DSC thermal scans. Residual surface deposits of PEG may also give the treated substrate an unattractive physical appearance and a wet-like or greasy feel. Dyeing machines, wash boxes and dyeing jigs and in-line wash mechanisms have been successfully utilized to neutralize substrates.

Usually a rinse, or wash, duration of 15 minutes is sufficient to return the fabric to an acceptable pH level of 6.5 to 7.5. The pH level of the water used in the processing facility itself should be monitored and the quantity of neutralizing agent used in the rinse water adjusted accordingly.

Soda ash is a quick and inexpensive way to neutralize any acid remaining in the substrate after treatment with the PEG formula.

During the final rinsing of the PEG-treated substrate in a third tank (T3), a commercial softener such as SHURFINE ULTRA may be added to the rinse water to give certain substrates a softer "drape", "hand," or "feel". An appropriate softener contains cationic surfactants.

An example of a neutralization wash box can be described as follows. The wash box is placed near the exit end of the drying/curing oven. Typically, the wash box would be, at a minimum, slightly wide than the maximum width of any substrate. The wash contains at least three liquid holding chambers. The first chamber (T1) would contain the neutralization agent; the second chamber would contain a rinse water-softening agent (T2), while the third chamber holds various commercial softeners and water(T3).

If required, prior to final drying the saturated substrate may then undergo an extraction process to remove excess H2O, preferably utilizing various vacuum extraction techniques or centrifuging.

MODULE "D" SECTION

Drying the PEG-Treated Substrate after Neutralization

A variety of techniques may be utilized to dry the PEG-treated substrate after it has been neutralized, softened and rinsed.

A curing oven of the type described in the Module "B" Section is suitable for drying many types of water saturated PEG-treated substrates after the neutralization step. Drum heaters of the type discussed in the Module "B" Section may also be used.

Another type of drying device that may be readily utilized is a "loop" dryer (FIG. 5) of the type found in many textile finishing and dying operations. A loop dryer is comprised of a large enclosed metal structure the length of which may vary depending upon its intended use and application. The width of the loop dryer roughly corresponds to the width of the web material being processed. The height of the loop dryer can run from 10 to 15 feet, again dependent upon its use and the types of substrates being processed.

Contained within the loop dryer are a series of drive rollers (2) and passive roller assemblies mounted across the top and bottom of the loop dryer. A heat source (3), such as steam, gas or infrared heaters, may be contained within the dryer to assist with the drying process. Fans (1) are used to circulate large quantities of the heated air around the looped substrate material.

To commence drying, the drive rollers begin moving the PEG-treated substrate in a relaxed state in a loop fashion from roller-to-roller through the dryer, while high speed fans and blowers circulate hot air within the loop drier cabinet at very high speeds and velocity, with the air exhausting from a stack positioned near the top of the dryer assembly.

The now dried PEG-treated and neutralized substrates passes through an exit slot in the loop drier cabinet and passes to a winding device which winds the now dried substrate into a roll (4). This completes the PEG application process.

Bulk Treatment of Finished Products with the PEG Technology

Figure 6:
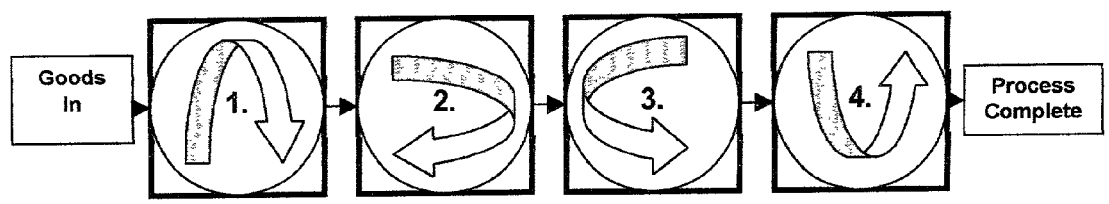
FIG. 6 depicts a process flow diagram for treating products with the PEG formula in a bulk processing environment according to the present invention.
Figure 7:
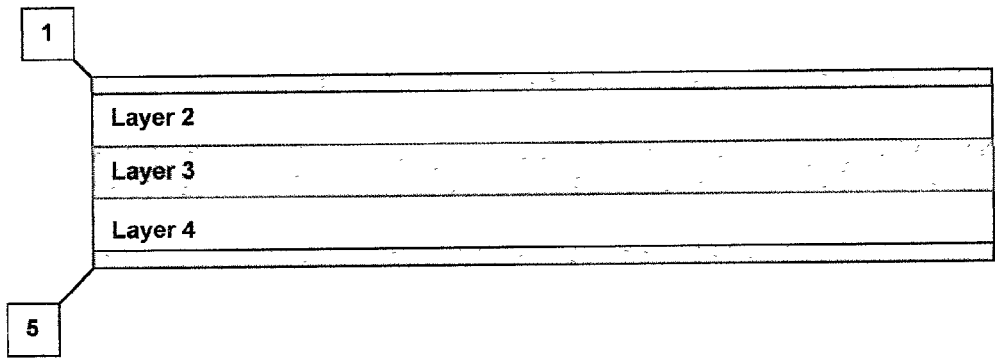
FIG. 7 depicts multiple layers of a substrate treated with the PEG formula according to the present invention.

An alternative approach has been employed for the PEG-treatment of certain types of fully converted products such as socks, knit shirt and caps as well as other fabric-based products that do not lend themselves to processing using The PEG System. This method is called "bulk treatment" (FIG. 6).

Using this technique, finished or converted fabric products are processed by combining a series of custom-made machines into a fully integrated PEG-treatment production operation. First the goods must be checked to assure they are free of oils, lubricants, softeners, etc., which could adversely effect cross-linking, then PEG formula is pumped into a combined bath/centrifuging container (1) and the products are saturated with the PEG formula. The remaining formula is drained from the container and returned to a storage tank for later reuse. The PEG treated goods are then spun in the container by a high-low speed reversible centrifuge action for specific periods of time to extract the excess formulation and arrive at the desired amount of wet add-on. The PEG-treated goods are automatically transferred from the container to a large tumble-type drier/washer unit (2) where they are dried and cured utilizing a computer monitored control system. The now cured PEG-treated products are then washed and neutralized in a tumble washer (3) and then subjected to a final tumble dry cycle in a large dryer unit (4).

An alternative approach to bulk treatment processing of the type just described, is to utilize specialized equipment which applies the PEG formula by spray application in a contained "tumbling," or rotating, environment. This type of device operates very much like a conventional front-loading washer. The bulk goods to be PEG-treated are placed in the device while a pre-measured amount of PEG formula is sprayed uniformly on the goods to be treated thereby providing very precise control of the amount of wet add-on used. The PEG-treated goods are then dried and cured in the same device as they continue to tumble and rotate. The neutralization solution may similarly be sprayed onto the treated goods, which are then rinsed and softened and given a final tumble dry.

Antimicrobial Properties of the PEG Technology

Various research and development activities and user field trials have demonstrated that the PEG Technology is anti-microbial and anti-fungal. The PEG Technology, which is non-toxic and contains no heavy metals, mechanically and environmentally controls certain microorganisms by depriving them of the surroundings they require to survive.

Under laboratory test conditions, using standardized AATCC 100, 147-1993 and ASTM G.21 test methods, the PEG Technology has shown to be effective in preventing the population of a broad range of gram positive and gram negative bacteria and fungi. Some of the bacteria and fungi evaluated to date include gram positive *B. epidermidis, C. albicans, M. cookei, S. epidermidis, T. rubrum* and *S.aureus*, gram negative *P. mirabilis* and *K. pneumoniae* as well as the fungi *A. niger, A. repens, P. finiculosum, C. globosum, G. virens* and *A. pullulans*.

User field trials of prototype incontinence underpads treated with the bound polyethylene glycol formulation demonstrated and improved condition to the skin of long-term bed ridden patients. Other tests demonstrated improved control of certain body odors normally derived from the population of bacteria on the skin.

As previously discussed, the polymer used in the PEG formulation is polyethylene glycol, a naturally hydrophilic substance with the ability to absorb, and retain, large quantities of liquid within the structure of the polymer molecule. The ability to absorb and retain large quantities of liquid in a substrate treated with the PEG formula is defined herein as the "A." Cause.

Additionally, after the PEG formula has been applied to a substrate, this structure becomes "thermally active." Briefly, this means that under certain ambient conditions, the PEG-treated fabric will absorb and store thermal energy. Conversely, the PEG-treated substrate will then release the previously stored thermal energy. Although not intended to be limited by theory, it is believed that the storing and releasing of thermal energy from a PEG-treated substrate is one of the causative effects of the antimicrobial properties of the PEG Technology. The storing and releasing of thermal energy in a PEG-treated substrate is defined herein is the "B" Cause.

The third active component of the mechanism used to kill the bacteria and fungi is the inherent surfactant properties of the PEG Technology. A surfactant is a "surface active agent" and, for example, includes molecules that have a special affinity for dirt or soil and that when applied to a soiled material will attach themselves to the dirt and soil to assist in their removal. Surfactants can be designed to increase the wetting ability of water by lowering its surface tension thereby allowing the water to immediately be absorbed into a material or fabric rather than remaining on the surface as droplets.

A "surfactant" has two distinctive parts, each with differing characteristics. One part of each surfactant molecule is hydrophilic while the other is hydrophobic. The hydrophobic component will attach itself to, or surround, any surface other than water, such as particulate dirt or soil, while the hydrophilic component of the molecule will push away from the material and not become attached. Therefore, when a particulate is surrounded by surfactant molecules, it will separate from the material and not become reattached. Again, without being limited by theory, it is believed that PEG-treated substrates impart a surfactant effect to the resulting structure thereby preventing the bacteria or fungi from becoming permanently attached. The surfactant properties of the PEG Technology is the "C. Cause."

An integral combination of the "A", "B" and "C" Causes prevent bacteria and fungi from growing or surviving in a laboratory environment with near 100% effectiveness. The "A." Cause induces desiccation, which deprives the bacteria and fungi of the moisture necessary for them to thrive on a PEG-treated substrate. This phenomena operates in concert with the "B." Cause which may thermally stress the bacteria and fungi by altering the thermal environment surrounding the bacteria or fungi by as much as 15° F. The "C." Cause, operating in concert with the "A." and "B." Causes, prevents the bacteria and fungi from gaining a permanent grip, or hold, on the PEG-treated substrate, thereby helping to prevent their population and growth.

A few of the product categories which are suitable for the application of the PEG Technology for its antimicrobial and anti-fungal properties include virtually all healthcare, institutional and consumer products such as wound care dressings and bandages, surgical gowns and drapes, bedding products of every kind, towels, wipes, cloths, fabrics for use in home and institutional furniture and for automobile interiors as well as for human apparel of every kind and type.

PEG Technology Dynamic Filter Media and Other Filter Applications

Filter media treated with the PEG Technology has the ability to dynamically expand, or reduce, its porosity dependent upon the amount of moisture present in an air stream. For certain filter applications where it is desirable to reduce air flow when the air stream contains unacceptable amounts of moisture, the PEG Technology may offer a unique solution to dynamically increasing, or decreasing, filter air flow and velocity dependent upon the moisture content of the air.

Polyethylene glycol is naturally hydrophilic and will absorb a large quantity of liquid in relation to its mass. As liquid is absorbed by the polyethylene glycol, it will swell, and expand in size. When the PEG Technology has been applied to an air filter media, this naturally occurring swelling expands the area covered by the PEG Technology and, correspondingly, dynamically reduces the porosity of the filter media. When the relative amount of moisture present in an air stream is reduced, the polyethylene glycol will begin to release the stored liquid and the filter porosity will return to its nominal, or normal, state.

With moisture present in a stream of air, the degree of dynamic porosity reduction in a PEG Technology-treated air filter is dependent upon (a) the type and denier of fibers used in the construction of the filter media, (b) filter density, (c) size and number of voids, due to the amount of add-on of the PEG Technology, and (e) the molecular weight of the polyethylene glycol used in the PEG Technology formulation. Variables a-e are independent of each other and during the design process, by adjusting these variables, a filter may be "tuned" for a particular dynamic filter application.

The reverse of the above is equally applicable. In certain areas of use, it may be desirable to increase airflow through a filter as the moisture content of the air is reduced.

Areas of application for PEG Technology-treated filter media include, for example, their use as a component part of an in-line filter assembly where the hydrophilic nature of polyethylene glycol is particularly applicable. To illustrate, a continuing problem with diesel fuel used to fuel trucks and boats, is water contamination of the diesel fuel itself. If this water is not removed from the diesel fuel, it will cause rust and other problems in the fuel injection systems used with diesel-type engines. An in-line filter canister contained a PEG filter media, in addition to capturing minute particulate matter, will readily remove, and trap, any water present in the diesel fuel within the polyethylene glycol polymer structure, even when the filter is subjected to the high pressures of a diesel fuel injection system.

Additional uses could include the filtering and trapping of water and moisture found in fuel systems and the components and structures of boats and ships or other structures and parts that are normally exposed to water and moisture on a regular basis. In these instances, PEG-treated filter media, or other types of PEG-treated substrates, could be used to remove and contain water.

Porosity of a Material or Substrate and Its Effect on Liquid Absorption and Retention The porosity, that is the number and size of pores or voids in a structure per square inch, of any substrate to be treated with the PEG formula has a direct correlation to the amount of liquid the structure will absorb and retain when saturated. Additionally, the ability to maintain the loft of a nonwoven structure after it has been saturated with a liquid also contributes to its ability to store and retain liquids to a particular design specification or goal.

The issue of size, and number of pores is applicable to any PEG-treated substrate, including nonwoven and foam-type structures where, as part of the substrate engineering and manufacturing process, pore size and number may be a design component of the finished product. In other words, this design parameter is a controllable variable.

The number and size of the void structure for PEG-treated substrates, such as nonwoven and foam-type structures, effects the maximum liquid absorption and retention as follows:

a. Polyethylene glycol is naturally hydrophilic and will swell and expand when saturated with a liquid thereby displacing, and at least partially filling, the available voids in the PEG-treated substrate; and
b. As a result of (a) above, additional, and/or larger, void structures can be engineered into the substrate to accommodate the storage of liquids not absorbed and retained by, the polyethylene glycol.
c. The following example illustrates the impact that the size and number of voids in a PEG-treated substrate has on its ability to absorb and retain liquids.
d. A prototype incontinence design goal of absorbing and retaining 500 grams of liquid in an area 20 inches squared roughly centered in the middle of an underpad sized 32 inches by 30 inches was established. This design goal was based on data taken from a histogram prepared by St. Pancreas Hospital, London, England, which was based on data collected from 1000 incontinent patients. The 500 grams liquid amount was from a very small percentage of the total patient population that voided the largest quantity of urine during any single discharge. The average urine discharge was approximately 125 grams of liquid.

For this example, numerous types of nonwoven materials were evaluated including thermal bound, hydro-entangled, air-laid and needle punched. Fiber blends included 45/55 blends of wood pulp fibers and polyester, 50/50 blends of cotton and polyester and 70/30 fiber blends of cotton and polyester. A 100% polyester nonwovens substrate was also evaluated. An acrylic latex binder was used in the air-laid substrate to maintain integrity until the PEG Technology had been applied which also provided additional strength to this nonwoven structure. Substrate loft, or thickness, ranged from 0.52 cm, to 1.40 cm. and was measured using Randall and Stickney thickness gauge at a pressure of 98.07.

Although several variations of the PEG formulation were utilized, the best results were achieved by using polyethylene glycol with a molecular weight of 1000.

A standardized test protocol was developed to measure and determine the water holding capacity of each sample PEG-treated nonwoven tested. The test involved completely submerging the test samples in de-ionized water for 10 minutes and then allowing them to hang vertically for 4 minutes. The samples were next blotted between six absorbent paper towels with a pressure of 4.4 kPa for two minutes. Each saturated PEG-treated sample was weighed and compared against an untreated nonwoven that had been subjected to the same test protocol.

Although other substrate types and fiber blends may perform equally well, of the six PEG-treated nonwoven substrates evaluated, the best performing were those substrates with (a), the highest amount of PEG dry add-on (b), the largest, and most numerous void structures (c), the highest loft construction and (d) those that were constructed from at least fifty (50%) per cent cellulose fibers.

Application of the PEG Formula to Polyurethane Foam or Other Type of Foam Substrates Another aspect of the present invention is the application of the PEG Technology to a foam structure, such as a one-quarter (¼") inch thick sheet of polyurethane foam with 50 pores per inch (ppi), for example. Foam substrates are not typically used as an alternative material to a knit, woven or nonwoven textile because such foamed materials are, hydrophobic, do not permanently retain colors, and do not resist the growth of bacteria or fungi, nor retard odor. However, after treatment with the PEG formula, the foam substrate acquires attributes and capabilities that will allow it to successfully compete in areas of application normally associated with a textile, such as shoe components or incontinence health care products, for example.

A foam substrate is defined as any porous structure containing pores and/or cells of uniform or varied sizes, whether rigid or flexible and of any size, loft or dimension, manufactured from a heated mixture of a specific polymer or blend of polymers. This liquid or viscous solution is then either foamed chemically, or foamed upon the injection of air or some other gas into the heated polymer. There are many well-known techniques used to manufacture foam, for example, reticulation. Naturally occurring foams, such as sponges, are also included in this definition.

When the PEG formula is applied to a foam substrate, the resulting treated foam structure will take on new and unique properties that increase the usefulness and value of the foam structure when incorporated into a commercial product. For example, after treatment with the PEG Technology, a substrate made from polyurethane foam, or any other type of foam structure, will become highly hydrophilic and will absorb and retain large amounts of liquid when compared to an untreated foam substrate which is hydrophobic and will absorb and retain only very small amounts of liquid in its non PEG-treated form particularly under pressure.

The PEG formula will also impart to a foam substrate antimicrobial properties which substantially prevent the growth of certain bacteria and fungi on the surface and within the core of the foam substrate itself. Other unique properties permanently imparted to a foam substrate after treatment with the PEG formula include improved color retention and phase-change thermal properties enabling the foam to absorb and store heat energy and to release the stored energy at predetermined levels.

The PEG formula would also be useful when applied to foam substrates that are used as filter media. For this area of application, the (a) antimicrobial properties, (b) the ability to manage the flow of air through a filter media by controlling its air permeability, and (c) the moisture modification properties provided by the application of the PEG formulas, would all offer substantial improvements when compared to a non PEG-treated foal filter media. The PEG formula may be applied equally effectively to other types of foam substrates, including those made from cellulose or from other plastics or polymers. Naturally occurring sponges may also be treated with the PEG Technology.

The general technique for applying PEG formula to any foam structure is as follows: as with any other substrate, the foam is first saturated with PEG formula. This may be accomplished either by full immersion of the foam structure in a container, or PAD tank, holding the formula, or by spray application across the width of the structure, or though the use of a combined spray application and vacuum extraction technique (see Module "A" Section for a more full explanation of the spray/vacuum extraction technique). When using a PAD, another method to apply PEG to a foam structure would be to compress the foam structure (using a nip roller assembly for example) as it is first fully immersed in the PEG-formula. When the foam structure emerges from the nip roller in a compressed state, it will immediately begin to expand and start to regain its original shape, and in doing so, will pull the PEG formula into the foam structure thereby thoroughly coating the interior voids of the foam with PEG.

As the saturated foam structure emerges from the PEG formulation holding tank, the excess formula is extracted from the saturated foam structure by compression or vacuum extraction, to the desired level of wet add-on. Either one or more pairs of nip rollers may be utilized for compressing the foam, or a standard vacuum extraction device may be incorporated into the process to extract the excess formula. After being compressed with a nip roller, a foam structure treated with the PEG formula, will naturally return to its original shape, and the problems normally associated with "matting" or "flattening" of a structure will be avoided.

After saturation with PEG, the foam substrate passes into the drying/curing oven. From this point on, the PEG application and curing process for foam is the same as that used for any other woven, knit or nonwoven substrate processed using The PEG System.

Multi-layered Substrates and Thermal Cascading

The term "thermal cascading" (FIG. 7) means that a number of individual substrates have been treated with the PEG Technology, with each substrate containing a progressively higher, or lower, molecular weight polyethylene glycol version of the PEG formula.

When these independently PEG-treated layers of substrates have been integrated into a single structure the release, or absorption, of thermal energy is substantially extended over a longer period of time and over a broader range of ambient temperatures, thereby retarding the escape, or penetration, of heat, or cold. By using "thermal cascading," a garment would become thermally "reversible," thereby providing user comfort throughout the year.

An example of "thermal cascading" is to create a garment with three individual layers of PEG-treated substrate (for example, treated with PEG 1000, 1200 and 1450 respectively. Each of these PEG designations has different temperature ranges at which they melt and solidify thus absorbing and releasing heat.

For cold weather wear, the PEG 1450 layer (Layer 2) would be worn closest to the body with the PEG 1000 (Layer 4) layer positioned in the outer most layer. The PEG 1450 layer, next to the body, would absorb heat and help maintain a desired core temperature of approximately 93° F. If this inner layer at anytime dropped to a temperature of less than 65° F., for example, the substrate would begin to release the stored thermal energy protecting the wearer. The second, or middle, layer (Layer 3) of the PEG-treated substrate, which incorporates the PEG 1200, requires less thermal energy to activate the melting phase of the crystalline structure and will absorb thermal energy up to approximately 80° F., and begin releasing the thermal energy at temperatures less than about 50° F., thereby slowing the penetration of cold while releasing heat.

Finally, the PEG 1000 layer (the outer most layer) will change thermally at a still lower temperature and will begin releasing the thermal energy when a cold temperature occurs. An additional advantage of "thermal cascading" is because low molecular weight PEG polymers absorb moisture more readily and effectively than high molecular weight PEG polymers, a more effective moisture management system can be developed. In this instance, maximum moisture wicking will occur with moisture wicking outward from the body (the highest molecular weight PEG-treated layer) toward the lowest molecular weight PEG-treated layer. For added comfort, in some instance it may be desirable to attach a waterproof breathable cover layer (Layer 1 and Layer 5) to one, or both, sides of the multi-layered PEG-treated substrates.

When the layered garment is reversed, the insulating performance is also. The resulting effect is that for both warm and cold weather wear, "thermal cascading" will prolong the comfort factor of the skin of the wearer and extended the duration of the cooling/warming phenomena over a wider range of temperatures, while further improving the comfort of the user by improving the moisture management of the garment.

This type of "thermal cascading" of PEG-treated substrates would have broad applicability when, for example, it is incorporated into various industrial insulation materials, or used in extreme temperature outdoor wear garments or included in certain surgical applications where a patient's body temperature needs to be maintained within in particular thermal range.

Use of the PEG Technology as a Binder to Maintain the Integrity of a Nonwovens Structure When manufacturing certain types of nonwoven substrates, such as those produced using the air-laid media technique (FIG. 8), that the PEG Technology may be used as a binder to form the air-laid media mat into an integrated matrix structure. Although air-laid media is used as an example herein, other types of nonwovens would equally benefit from the application of the PEG Technology as a binder media.

Air-laid media is produced by blending various types of fibers in a large fiber chamber. The fibers are mixed using high-pressure air blowers. The fibers then form a high loft mat of tangled fibers. A belt transports the loose fiber mat through roller devices (1) that compress and reduce the loft of the air-laid structure to the desired height and density. At this point the air-laid media structure has no strength and integrity and is held in position by the transportation belt mechanism only.

The transportation belt mechanism carries the loose fiber mat over a vacuum extraction slot assembly similar to that previously described (FIG. 2) which pulls up, into, and through, the loose air-laid structure, a viscous, foamed acrylic latex binder. The purpose of this binder when dried and cured, is to "glue" the loose fibers into an integrated matrix structure. A secondary purpose of the latex binder is to provide the air laid nonwoven substrate with strength and integrity so it may be converted into a variety of useful commercial products, such as industrial air filters.

The now binder-saturated air-laid structure passes into, and through, an oven of the type previously described in the Module "B" Section (FIG. 3) where it is cured.

Instead of using a latex binder, the PEG formula may be used as a binder to "glue" the random air-laid fiber mat into an integrated matrix structure. This is accomplished because the crosslinking agents contained within the PEG formula will crosslink with, or bond to, the intersecting fibers within the air-laid mat substrate. The techniques used to apply the PEG formula to the air-laid mat are the same as presently employed to apply acrylic latex.

The benefits of using PEG as a binder media for certain nonwoven structures include: (a) the cost of the latex binder will be eliminated (b), the PEG-treated air-laid substrate will contain all of the benefits of the PEG Technology including thermal relevancy, antimicrobial properties, increased strength and integrity and enhanced liquid absorbency and retention (c), and the application of the PEG Technology may be inserted into an existing nonwovens production line without modification or additional cost.

Creating a Flexible, or Semi-Rigid, Film with the PEG Technology

The PEG formula, when blended with a plasticizer, or other chemicals, may be cast as a flexible, or semi-rigid, film structure.

When cast as a film, the PEG formula may be incorporated into various products that may be wrapped, or formed around another object. For example, a PEG-type film structure could be wrapped around various cable connectors, such as connectors of the type used to join fiber optics bundles, to prevent moisture and fungi from gaining access to the ends of the fiber optics strands thereby causing a degradation of performance of the transmission of optical signals. Another example of a flexible film application, is a PEG-film tray liner of the type used by meat markets to capture liquids. The liquid absorption and antimicrobial properties of the PEG-film would prevent the population of bacteria and absorb the liquids. A third example of a flexible film incorporating PEG would be its use as a thermal buffer to stabilize the temperature of electronic components. When placed on, or adjacent to, electronic components which generate heat (such as a digital processor, for example) the PEG film would, depending upon the circumstances, either absorb, or release heat generated by the electronic component. As a result, the digital processor would (a) operate within a more consistent temperature range and/or (b), be subjected to reduced thermal stress, thereby increasing its useful life.

To construct a film material which incorporates PEG in a production environment, the PEG formula would be blended with other chemicals, such as plasticizers, and then scrape coated (or, "cast") onto a silicon release liner. The liner carries the cast film through a curing oven where the PEG film is cured at a temperature not to exceed 220° F. (105° C.). When cured, the PEG film is separated from the liner and pulled through a neutralization bath which removes all remaining non-reacted acids and resins from the film. The film is dried with hot air, and the film is rolled into a roll and the process has been completed.

The equipment used to produce the PEG-film is of the type that is currently utilized to produce many types of commercial film materials such as flexible polyurethane films, for example. In some instances it may be useful to laminate the PEG-film to other types of film structures to provide additional integrity or strength or to make the PEG-film more adaptable for a larger variety of film applications and uses.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances that fall within the scope of the appended claims.

The invention claimed is:

1. A method of manufacturing a polyethylene glycol treated fabric comprising:
    (a) exposing a fabric to a polyethylene glycol formulation including an acid catalyst and a resin to form a wet fabric;
    (b) heating and curing the wet fabric at a temperature such that the surface temperature of the wet fabric reaches a temperature sufficient to initiate a catalytic reaction for bonding the polyethylene glycol formulation to the fabric and in the heating and curing step the surface temperature does not exceed 220° F. to form a treated fabric;
    (c) neutralizing the treated fabric in a basic wash bath and forming a neutral fabric whereby the potential for reaction reversal and polymer washout is eliminated; and
    (d) drying the neutralized fabric.

* * * * *